United States Patent
Brewer et al.

(10) Patent No.: US 10,036,408 B2
(45) Date of Patent: Jul. 31, 2018

(54) HYDRAULIC VALVE

(71) Applicant: Claverham Limited, Bristol, Avon (GB)

(72) Inventors: Paul Brewer, Bristol (GB); Reg Raval, Bristol (GB); Phillip A. Rowles, Bristol (GB)

(73) Assignee: CLAVERHAM LTD., Bristol, Avon (GB)

( * ) Notice: Subject to any disclaimer, the term of this patent is extended or adjusted under 35 U.S.C. 154(b) by 0 days.

(21) Appl. No.: 15/229,365

(22) Filed: Aug. 5, 2016

(65) Prior Publication Data

US 2017/0037877 A1    Feb. 9, 2017

(30) Foreign Application Priority Data

Aug. 7, 2015 (EP) .................. 15180222

(51) Int. Cl.
| | |
|---|---|
| F15B 13/04 | (2006.01) |
| F16K 11/07 | (2006.01) |
| F16K 31/60 | (2006.01) |
| F16K 31/52 | (2006.01) |
| F15B 18/00 | (2006.01) |
| F15B 13/12 | (2006.01) |

(52) U.S. Cl.
CPC .......... *F15B 13/0402* (2013.01); *F15B 18/00* (2013.01); *F16K 11/07* (2013.01); *F16K 11/0716* (2013.01); *F16K 31/52* (2013.01); *F16K 31/602* (2013.01); *F15B 13/12* (2013.01); *F15B 2211/324* (2013.01); *F15B 2211/41581* (2013.01)

(58) Field of Classification Search
CPC ...... F16K 11/07; F16K 11/0716; F16K 31/52; F16K 31/602; F15B 13/0402; F15B 18/00
See application file for complete search history.

(56) References Cited

U.S. PATENT DOCUMENTS

| | | | |
|---|---|---|---|
| 1,908,396 A | 5/1933 | Albright | |
| 3,825,670 A * | 7/1974 | Katz | .................... H02G 15/107 174/21 R |
| 3,939,870 A * | 2/1976 | Guigliano | ........... F15B 13/0402 137/624.27 |

(Continued)

FOREIGN PATENT DOCUMENTS

| | | |
|---|---|---|
| EP | 0068728 A1 | 1/1983 |
| EP | 0073886 A1 | 3/1983 |

(Continued)

OTHER PUBLICATIONS

European Search Report for Application No. 15180222.0-1751 dated Jan. 29, 2016; 8 Pages.

*Primary Examiner* — Craig Schneider
*Assistant Examiner* — Kevin Barss
(74) *Attorney, Agent, or Firm* — Cantor Colburn LLP

(57) ABSTRACT

A spool for a hydraulic spool valve, comprising: a pressure chamber for connecting a pressure line to a hydraulic cylinder; at least one return chamber for connecting the hydraulic cylinder to a reservoir; and an actuator slot for receiving a drive lever; wherein the spool further comprises a fluid path connecting said pressure chamber to said actuator slot and a pressure plate movably mounted in the slot such that in use it is disposed between the fluid path and the drive lever.

14 Claims, 3 Drawing Sheets

(56) References Cited

U.S. PATENT DOCUMENTS

| | | | | |
|---|---|---|---|---|
| 4,128,047 A * | 12/1978 | Caero | ............... | B64C 13/44 |
| | | | | 137/624.27 |
| 4,434,708 A * | 3/1984 | Bowden | ............... | F15B 13/021 |
| | | | | 137/494 |
| 5,671,651 A * | 9/1997 | Pfaff | ............... | B64C 13/42 |
| | | | | 91/523 |
| 6,192,928 B1 * | 2/2001 | Knoell | ............... | F15B 11/05 |
| | | | | 137/596 |
| 6,440,028 B2 * | 8/2002 | Kim | ............... | F15B 13/0402 |
| | | | | 475/130 |
| 6,523,453 B2 * | 2/2003 | Sedon | ............... | F15B 13/0402 |
| | | | | 137/596.2 |
| 6,634,280 B2 * | 10/2003 | Sowden | ............... | A47J 31/3614 |
| | | | | 99/289 R |
| 6,689,007 B2 * | 2/2004 | Warnke | ............... | F16H 61/0276 |
| | | | | 137/247.17 |
| 7,787,493 B2 * | 8/2010 | Doi | ............... | H04W 52/0245 |
| | | | | 370/468 |
| 2007/0125433 A1 | 6/2007 | Lee | | |
| 2015/0013804 A1 | 1/2015 | Pieper | | |

FOREIGN PATENT DOCUMENTS

KR           101409765 B1    6/2014
WO              9428317 A1    12/1994

\* cited by examiner

HYDRAULIC VALVE

FOREIGN PRIORITY

This application claims priority to United Kingdom Patent Application No. 15180222.0 filed Aug. 7, 2015, the entire contents of which is incorporated herein by reference.

TECHNICAL FIELD

This disclosure relates to hydraulic spool valves (also referred to as hydraulic servo valves), particularly those used in duplex hydraulic systems for redundancy such as are often used in aerospace applications.

BACKGROUND

Duplex hydraulic systems are used for example in aircraft actuator systems for redundancy and safety so that if one system fails, the other remains operational, allowing continued control of the relevant system. For example the main rotor actuator in a helicopter typically uses a duplex control system. Failure modes may include seal failures (leaks), pipe bursts, component structural failure or pump failure. Triplex and even quadruplex systems are also used in some applications.

Hydraulic spool valves in Flight Control actuators are usually driven by a mechanical lever connected to the pilots input lever which is in turn connected to the pilot's controls by a mechanical linkage. Where duplex hydraulic systems are employed for redundancy and safety reasons, two valves are used, one for each system, driven by a single layshaft and lever assembly. Synchronization of these two valves is critical to avoid potentially damaging 'force fight' between the two hydraulic systems. Force fight is created by the two valves being out of synchronization and this can lead to pressure intensification within the actuator. This intensification can cause premature seal failures and may also cause fatigue damage within the actuator. Any backlash or clearances due to manufacturing tolerances between the drive levers and the spools is exploited and can lead to unequal base pressures which in turn can cause unsatisfactory performance. Force fight can occur in actuators with tandem cylinder configurations as shown in FIG. 3. The four chamber pressures within the cylinder need to be precisely controlled so as to minimise the internal forces generated within the tandem piston and cylinder arrangement. These chamber pressures (referred to as base pressures) are controlled by very small spool displacements (around 0.001 inch) and therefore any small amount of deviation in the valve synchronization between the two hydraulic systems can result in damaging force fights.

It is therefore necessary to manufacture to extremely tight tolerances to ensure zero or minimum clearances.

SUMMARY

According to this disclosure there is provided a spool for a hydraulic spool valve, comprising: a pressure chamber for connecting a pressure line to a hydraulic cylinder; at least one return chamber for connecting the hydraulic cylinder to a reservoir; and an actuator slot for receiving a drive lever; wherein the spool further comprises a fluid path connecting said pressure chamber to said actuator slot and a pressure plate movably mounted in the slot such that in use it is disposed between the fluid path and the drive lever.

The pressure plate and pressurized fluid path of this spool essentially provide a preload device which utilizes the hydraulic pressure within the valve to reduce the effect of backlash. As the pressure pushes the plate against the drive lever, the drive lever is held firmly in place within the slot as it is pressed against the opposite wall of the slot. With this arrangement, there is no requirement for extremely tight tolerances in the manufacture of the actuator slot, thus reducing the manufacturing time and cost. For example, this arrangement allows the use of cost effective manufacturing methods. Also, backlash that would normally have developed over time due to wear does not result in backlash with this arrangement as the pressure plate will still ensure that contact is maintained between the drive lever, the pressure plate and the opposite wall of the slot. In other words, this arrangement is essentially self-compensating for wear.

As this arrangement eliminates backlash completely, the system can be configured so that there is no potentially damaging force fight between two (or more) valves within a duplex (or higher order) system as the drive lever will act on the two (or more) spools in unison, i.e. it will effect perfectly simultaneous movement of the two (or more) spools whereas a system with backlash would have resulted in one spool moving before the other.

To minimise backlash it is common practice to machine either the spool slot or drive lever to match exactly the dimensions of the other mating part. This is time consuming and expensive with the added problem of wear that can occur at a later stage of the actuator life.

In some examples, seals could be provided on or around the pressure plate to prevent the pressurized fluid from escaping from behind the pressure plate. However, such seals add complexity and cost and therefore it is preferred to provide no fluid tight seals around the pressure plate. Preferably the fluid path, actuator slot and return chamber are arranged such that fluid passing through the fluid path into the actuator slot drains to the return chamber. Thus the fluid can leak out from behind the pressure plate into the actuator slot and from there it simply drains to the return line. Preferably no seals are provided between the actuator slot and the return chamber.

The fluid path may take any form and may be positioned anywhere on or around the spool. However, in some preferred examples the spool comprises a shaft in which the pressure chamber and return chamber are formed and the fluid path is formed internally of the shaft. Forming the fluid path internally of the shaft is spatially efficient and means that the path does not interfere with any other operational parts of the spool shaft and valve. Also no additional conduits are required.

Preferably the fluid path comprises an axial bore along the shaft. An axial bore may be formed on the central axis of the shaft or may simply be parallel with the axis, depending on the particular implementation A bore can be formed simply by drilling into the shaft and is thus a simple modification that can be made to existing manufacturing processes without necessarily completely redesigning the spool or spool shaft. It may even be possible for an existing spool to be modified to the new design. Preferably the fluid path also comprises a transverse bore from the pressure chamber that connects with the axial bore. The axial bore provides the opening to the pressure plate and actuator chamber and the transverse bore provides the opening into the pressure chamber. Together the two bores form the fluid path and fluidly connect the pressure chamber to the actuator slot. The transverse bore may be a radial bore directed towards the central axis of the shaft or it may be parallel to a radius (e.g.

if the axial bore is not on the shaft axis). In general it is preferred to provide the axial bore on the shaft axis and a radial transverse bore to connect with it as this improves the symmetry of the spool and is easier for manufacture. In preferred examples the transverse bore extends through the whole diameter of the shaft, thus forming two holes in the circumference of the shaft as well as connecting with the axial bore (i.e. forming a T-junction with the axial bore). This arrangement is again easier for manufacture as the depth of the transverse drilling does not need to be precisely controlled and also provides better symmetry and better fatigue and stress resistance. In a typical spool arrangement the pressure chamber is formed as an annular chamber around the spool shaft and thus both openings of the transverse bore allow pressurized fluid to connect with the axial bore.

In some examples, the plate may comprise a cavity on the side facing the fluid path. This cavity may be formed by hollowing out (e.g. milling out) a shallow groove or recess in the plate. The size of this cavity will determine the force with which the pressure plate presses against the drive lever and thus the size and/or shape of the cavity may be varied depending on the particular design. The cavity is preferably sized such that the pressure from the fluid path is sufficient to keep the drive lever pressed firmly against the opposite wall of the slot.

The fluid path itself (e.g. the bores) may well provide a sufficiently restricted diameter to limit the pressure on the pressure plate. Indeed the bore diameters can be selected to produce the desired pressure. However, if the bore diameter is too large, a flow restrictor may be disposed in the fluid path (e.g. inserted into a bore) in order to further restrict the flow of fluid from the pressure chamber to the actuator slot.

The pressure plate must be able to move relative to the actuator slot as the high pressure fluid pushes against it. In order to keep the plate aligned and held in place relative to the spool shaft, the plate may have guides. The guides may be formed either on the plate or on the spool shaft, but preferably a component of the guides is formed on each, e.g. as grooves and corresponding rails. In some preferred examples, the guides take the form of projections on the pressure plate that slide in corresponding grooves formed on the spool shaft. Thus the grooves hold the plate against transverse movement that would cause it to exit the actuator slot, while permitting the axial movement that allows the plate to press against the drive lever.

According to a further aspect, this disclosure provides a spool valve comprising a spool as described above (optionally including any of the optional or preferred features also described above), comprising: a housing to receive the spool; and fluid connections to connect the pressure chamber and at least one return chamber of the spool to a pump, a hydraulic cylinder and a reservoir.

According to yet a further aspect, this disclosure provides a duplex or higher order hydraulic actuator comprising two or more spool valves as described above (optionally including any of the optional or preferred features also described above), connected to operate in parallel by the same drive mechanism to operate the same hydraulic cylinder.

The examples above are described predominantly in relation to aircraft flight control actuators, but they are also applicable to other hydraulic valve applications. For example they could also be used in commercial, non-aerospace hydraulic valve applications (simplex, duplex or higher order) to simplify the manufacture of spool/drive lever assemblies.

BRIEF DESCRIPTION OF DRAWINGS

One or more non-limiting examples will now be described, by way of example only, and with reference to the accompanying figures in which:

FIG. 1 shows a conventional single spool 20 and layshaft drive 10 from a conventional hydraulic actuator servo valve (and a full implementation is illustrated in FIG. 3). Backlash between the layshaft drive lever 10 and the wall of the slot 22 of the spool 20 in which the layshaft drive lever 10 sits is indicated by reference numeral 26. This backlash 26 arises due to manufacturing tolerances or wear of the components over time. The backlash 26 is simply a difference in size between the drive lever 10 and the internal width of the slot 22 in which it sits. The backlash 26 results in the drive lever 10 having an amount of play within the slot, i.e. the drive lever 10 can move back and forth without causing a corresponding movement of the spool 20. This backlash 26 will lead to hysteresis in performance and undesirable force fight in the case of multiple hydraulic systems (e.g. duplex, triplex, etc.). This effect can be minimized by the use of tight tolerances and selective assembly but this is an expensive and time consuming process. Moreover, the backlash that arises due to wear over time can only be corrected by replacing parts so as to achieve a better fit again.

Figure 1:
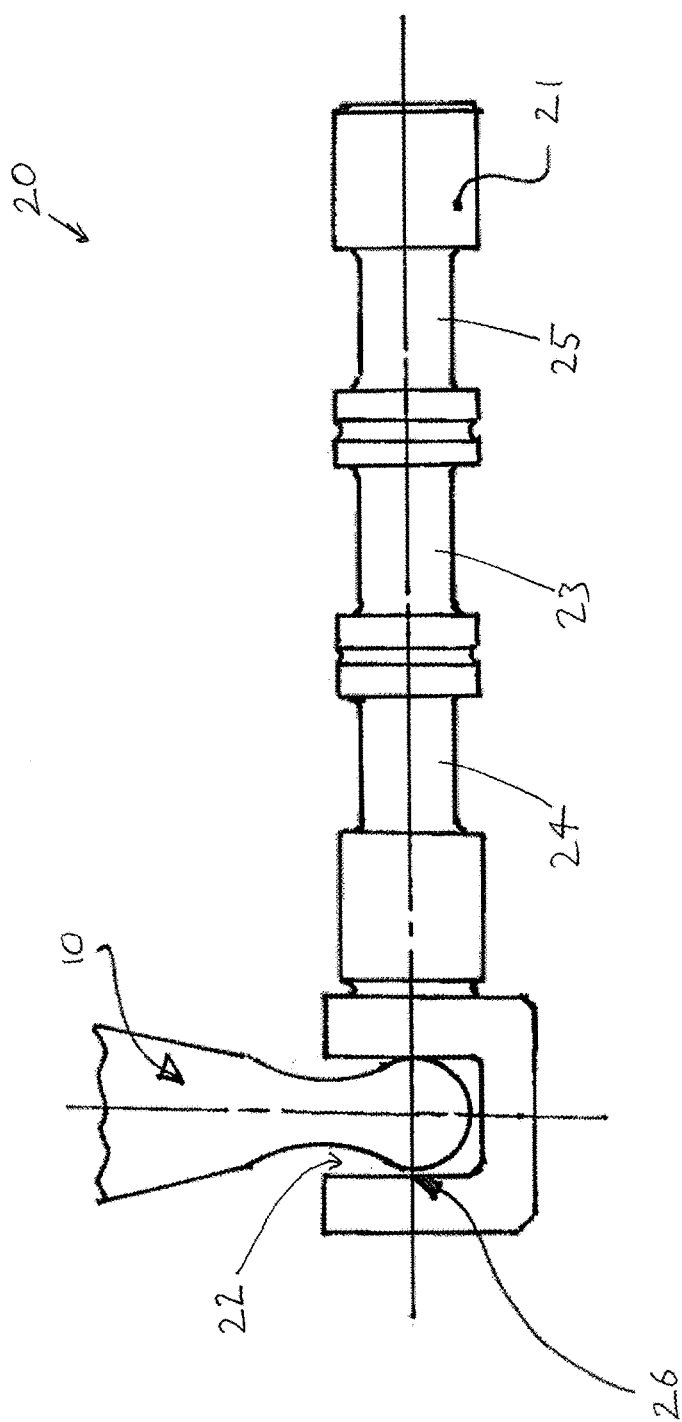
FIG. 1 illustrates the problem of backlash in a spool valve.

The spool 20 has a shaft 21 that extends axially and, in use, is moved axially back and forth so as to alter the fluid connections of the valve of which it is a part. The shaft 21 is an elongate cylinder (typically of circular cross-section, although this is not essential) with various chambers formed along its length. The spool 20 includes a pressure chamber 23 in the middle, located between a first return chamber 24 and a second return chamber 25. Depending on the axial position of the spool 20, the pressure chamber 23 will connect a high pressure inlet to a selected high pressure outlet. In a typical arrangement, a hydraulic valve may be used to direct the high pressure fluid from the inlet to a selected side of a piston within a hydraulic cylinder in order to cause movement of the piston within the cylinder. At the same time, the axial position of the spool determines which of the first and second return chambers 24, 25 is connected to a corresponding return line. In a typical arrangement of a hydraulic valve, the return line and return chambers 24, 25 allow fluid from the non-pressurised side of the hydraulic cylinder to drain back to a reservoir as the piston moves.

FIGS. 2a-e show a spool 20 of similar construction and use to that of FIG. 1, but with the addition of a small piston plate 26 (pressure plate) fitted inside the layshaft drive slot 22 as shown.

Figure 2:
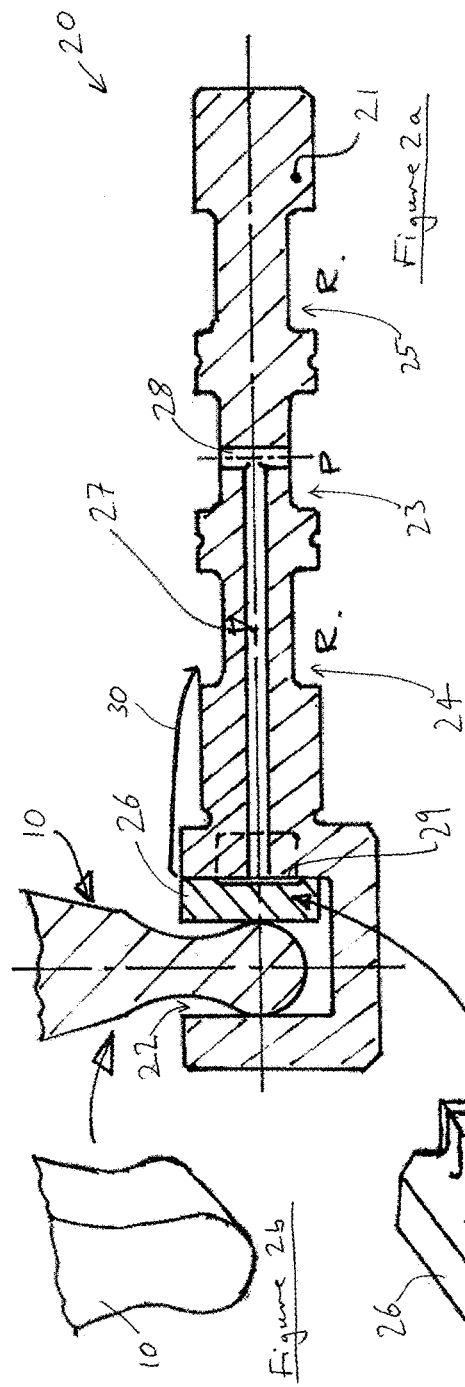
FIG. 2a-FIG. 2e illustrate an example of this disclosure with an anti-backlash pressure plate.
Figure 2:
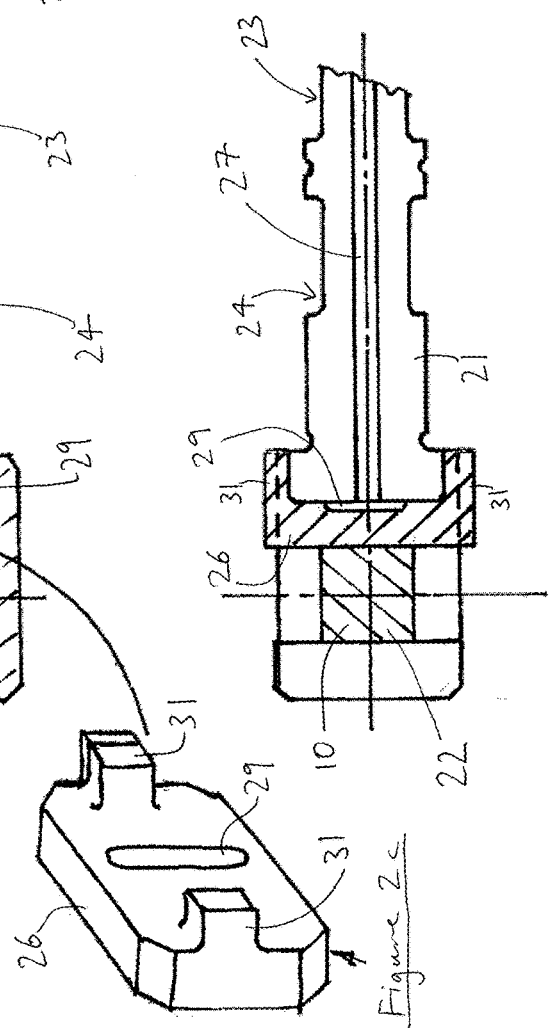
Figure 2:
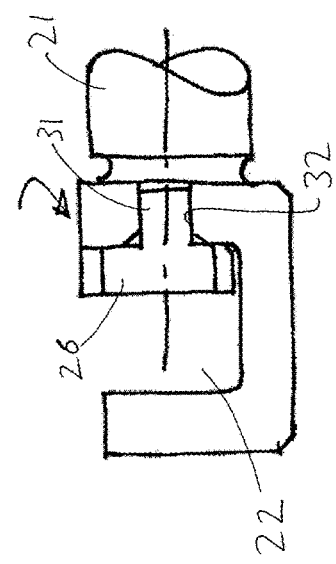

FIG. 2a shows a cross-section view from one side. FIG. 2b shows an isometric view of the shape of the drive lever 10. FIG. 2c shows an isometric view of the pressure plate (piston plate) 26. FIG. 2d shows a plan section view. FIG. 2e shows a side view of the actuator slot 22.

As best illustrated in FIG. 2a, the plate 26 is pressurized by a fluid path way that is formed from an axial drilling 27 (i.e. a bore drilled in the spool shaft 21) and a transverse drilling 28 (i.e. a bore drilled through the diameter of the shaft 21) that together connect the drive slot 22 to the pressure supply section (pressure chamber) 23 of the spool 20. The cross-sectional area of this drilling 27 is sized to produce the optimum plate/lever force to ensure smooth operation of the valve. The pressure moves the plate 26 toward the drive lever 10 and ensures that the plate 26 and thus the spool 20 is connected to the layshaft 10 with zero backlash.

The piston plate 26 can be formed with a reasonably tight fit to the actuator slot 22, but no seals are used to prevent flow of the pressurized fluid from leaking out into the slot 22. However, the leakage of pressurized fluid from this arrangement as the valve operates is collected in the layshaft lever cavity 22 which is connected in turn to the hydraulic system return line via the first return chamber 24 as illustrated by the arrow 30 in FIG. 2*a*.

As shown in FIG. 2*c*, the pressure plate 26 has a shallow cavity 29 hollowed out of the side that faces the axial bore 27. The cavity 29 is located directly opposite the opening of the axial bore 27 so as to receive fluid that passes along the bore 27. The area of the cavity 29 determines the force that is applied to the layshaft 10 and is selected so as to ensure that the layshaft 10 is kept sandwiched between the pressure plate 26 and the opposite wall of the slot 22. The plate 26 is also provided with two projections 31, one at either side that align the plate 26 within the slot 22. The projections 31 (formed as projecting legs that, together with the main body of the plate 26 form a U-shape) locate in grooves 32 provided on the side of the shaft 21 (specifically on the side of the slot 22) as depicted in FIG. 2*e*. Together the projections 31 and grooves 32 form guides that allow the plate 26 to move back and forth so as to accommodate any backlash that is present between the drive lever 10 and the walls of the slot 22. The plate 26 can also move to accommodate any backlash that might develop through wear of either the drive lever 10 or the walls of the slot 22 over time.

Figure 3:
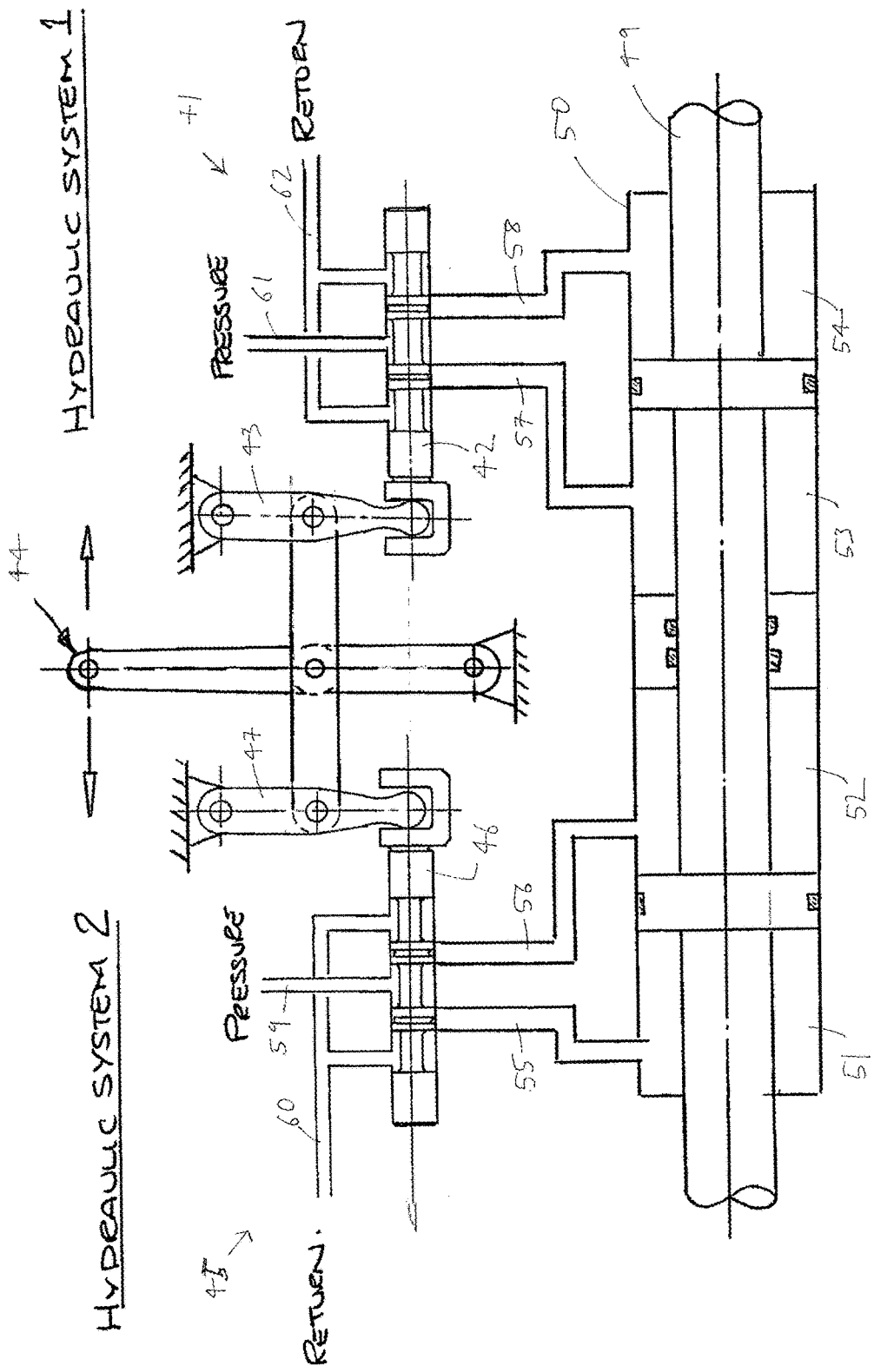
FIG. 3 schematically shows a duplex hydraulic actuator.

FIG. 3 schematically shows a duplex hydraulic actuator system 40 with a first hydraulic system 41 and a second hydraulic system 45. First hydraulic system 41 has a first spool valve 42 which is actuated via first mechanical linkage 43 by common input lever 44. Second hydraulic system 45 has a second spool valve 46 which is actuated via second mechanical linkage 47 by common input lever 44.

Hydraulic cylinder 50 houses piston 49. Four fluid chambers are formed between the piston 49 and the cylinder 50, namely first fluid chamber 51, second fluid chamber 52, third fluid chamber 53 and fourth fluid chamber 54.

When common input lever 44 is moved to the right (in the figure), the two spool valves 42, 46 are moved to the right. First spool valve 42 thus connects pressure line 61 to line 58, causing hydraulic fluid to flow into fourth chamber 54. At the same time, line 57 is connected to return line 62 allowing hydraulic fluid to flow out of third chamber 53. Simultaneously, second spool valve 46 connects pressure line 59 to line 56, causing hydraulic fluid to flow into second chamber 52. At the same time, line 55 is connected to return line 60 allowing hydraulic fluid to flow out of first chamber 51. Piston 49 is therefore caused to move to the left.

When common input lever 44 is moved to the left (in the figure), the two spool valves 42, 46 are moved to the left. First spool valve 42 thus connects pressure line 61 to line 57, causing hydraulic fluid to flow into third chamber 53. At the same time, line 58 is connected to return line 62 allowing hydraulic fluid to flow out of fourth chamber 54. Simultaneously, second spool valve 46 connects pressure line 59 to line 55, causing hydraulic fluid to flow into first chamber 51. At the same time, line 56 is connected to return line 60 allowing hydraulic fluid to flow out of second chamber 51. Piston 49 is therefore caused to move to the right.

It can be appreciated from FIG. 3 that any backlash in either of the valves will cause one spool valve 42, 46 to connect its pressure line to the cylinder before the other valve has moved. This can cause a build up of pressure in one of the four fluid chambers 51-54 while the piston 49 is unable to move within cylinder 50. This pressure build up may for example cause damage to the seals or to the fluid transfer lines. By contrast, when the anti-backlash design of FIGS. 2*a*-2*e* is employed for both the spool valves 42, 46, there will be no backlash and the two valves will operate in synchrony with no force fight.

The invention claimed is:

1. A spool for a hydraulic spool valve, comprising:
   a pressure chamber for connecting a pressure line to a hydraulic cylinder;
   at least one return chamber for connecting the hydraulic cylinder to a reservoir; and
   an actuator slot for receiving a drive lever;
   wherein the spool further comprises a fluid path connecting said pressure chamber to said actuator slot and a pressure plate movably mounted in the slot such that in use it is disposed between the fluid path and the drive lever and maintains contact with the drive lever.

2. A spool as claimed in claim 1, wherein said fluid path, actuator slot and return chamber are arranged such that fluid passing through the fluid path into the actuator slot drains to the return chamber.

3. A spool as claimed in claim 2, wherein no seals are provided between the actuator slot and the return chamber.

4. A spool as claimed in claim 1, wherein the spool comprises a shaft in which the pressure chamber and return chamber are formed and wherein the fluid path is formed internally of the shaft.

5. A spool as claimed in claim 4, wherein the fluid path comprises an axial bore along the shaft.

6. A spool as claimed in claim 5, wherein the fluid path comprises a transverse bore from the pressure chamber that connects with the axial bore.

7. A spool as claimed in claim 6, wherein the transverse bore extends through the whole diameter of the shaft.

8. A spool as claimed in claim 1, wherein the plate comprises a cavity on the side facing the fluid path.

9. A spool for a hydraulic spool valve, comprising:
   a pressure chamber for connecting a pressure line to a hydraulic cylinder;
   at least one return chamber for connecting the hydraulic cylinder to a reservoir; and
   an actuator slot for receiving a drive lever;
   wherein the spool further comprises a fluid path connecting said pressure chamber to said actuator slot and a pressure plate movably mounted in the slot such that in use it is disposed between the fluid path and the drive lever;
   wherein the pressure plate comprises a cavity on the side facing the fluid path; and
   wherein the cavity is sized such that the pressure from the fluid path is sufficient to keep the drive lever pressed firmly against the opposite wall of the slot.

10. A spool as claimed in claim 1, further comprising:
    a flow restrictor in the fluid path.

11. A spool as claimed in claim 1, wherein the plate has guides to keep it aligned within the slot.

12. A spool as claimed in claim 11, wherein the guides are in the form of projections that slide in corresponding grooves formed on the spool shaft.

13. A spool valve comprising:
    a spool including:
    a pressure chamber for connecting a pressure line to a hydraulic cylinder;

at least one return chamber for connecting the hydraulic cylinder to a reservoir; and an actuator slot for receiving a drive lever;

wherein the spool further comprises a fluid path connecting said pressure chamber to said actuator slot and a pressure plate movably mounted in the slot such that in use it is disposed between the fluid path and the drive lever and maintains contact with the drive lever; and a housing to receive the spool; and fluid connections to connect the pressure chamber and at least one return chamber of the spool to a pump, a hydraulic cylinder and a reservoir.

14. A hydraulic actuator comprising:

two or more spool valves as claimed in claim 13;

wherein the two or more spool valves are connected to operate in parallel by a same drive mechanism to operate a same hydraulic cylinder.

\* \* \* \* \*